(12) United States Patent
Ji et al.

(10) Patent No.: US 8,667,500 B1
(45) Date of Patent: Mar. 4, 2014

(54) USE OF DYNAMIC ENTITLEMENT AND ADAPTIVE THRESHOLD FOR CLUSTER PROCESS BALANCING

(75) Inventors: Minwen Ji, Sunnyvale, CA (US); Carl A. Waldspurger, Palo Alto, CA (US); John R. Zedlewski, Cambridge, MA (US)

(73) Assignee: VMware, Inc., Palo Alto, CA (US)

(*) Notice: Subject to any disclaimer, the term of this patent is extended or adjusted under 35 U.S.C. 154(b) by 1526 days.

(21) Appl. No.: 11/582,936

(22) Filed: Oct. 17, 2006

(51) Int. Cl.
*G06F 9/46* (2006.01)

(52) U.S. Cl.
USPC .............................. 718/105; 718/102; 718/104

(58) Field of Classification Search
None
See application file for complete search history.

(56) References Cited

U.S. PATENT DOCUMENTS

| | | | | |
|---|---|---|---|---|
| 6,785,889 B1* | 8/2004 | Williams | ................... | 718/104 |
| 6,993,762 B1* | 1/2006 | Pierre | ...................... | 718/102 |
| 7,203,944 B1* | 4/2007 | van Rietschote et al. | ...... | 718/104 |
| 7,360,219 B2* | 4/2008 | Rhine | ......................... | 718/104 |
| 7,607,129 B2* | 10/2009 | Rosu et al. | ....................... | 718/1 |
| 7,730,486 B2* | 6/2010 | Herington | ......................... | 718/1 |
| 2004/0064556 A1* | 4/2004 | Zhang et al. | ................... | 709/225 |
| 2005/0262504 A1* | 11/2005 | Esfahany et al. | ................. | 718/1 |
| 2006/0005189 A1* | 1/2006 | Vega et al. | ........................ | 718/1 |
| 2006/0123423 A1* | 6/2006 | Brenner | ........................ | 718/105 |
| 2007/0130566 A1* | 6/2007 | van Rietschote et al. | ......... | 718/1 |
| 2007/0204266 A1* | 8/2007 | Beaty et al. | ....................... | 718/1 |
| 2008/0022285 A1* | 1/2008 | Cherkasova et al. | .......... | 718/104 |
| 2009/0300605 A1* | 12/2009 | Edwards et al. | .................. | 718/1 |
| 2010/0146515 A1* | 6/2010 | Shpigelman | ................... | 718/104 |

* cited by examiner

*Primary Examiner* — Meng An
*Assistant Examiner* — Tammy Lee (57) ABSTRACT

Processes are balanced among multiple computer systems. The allocation policies and resource demands of multiple processes executing on multiple computer systems are used to determine the resource imbalance of the computer systems. Resource imbalance can be used to determine whether a process should be migrated from one computer system to another. Resource imbalance of multiple resources can be combined to determine overall imbalance of the computer systems. Overall imbalance can be used to determine whether a process should be migrated from one computer system to another. Imbalance of resources can be determined for resources such as processor time, memory, network bandwidth, and storage. Virtual machines can be balanced among multiple computer systems operating in a cluster.

71 Claims, 8 Drawing Sheets

USE OF DYNAMIC ENTITLEMENT AND ADAPTIVE THRESHOLD FOR CLUSTER PROCESS BALANCING

BACKGROUND OF THE INVENTION

1. Field of the Invention

The invention relates generally to computer load balancing, and specifically to balancing of processes in a cluster of computer systems.

2. Description of Background Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

Figure 1:
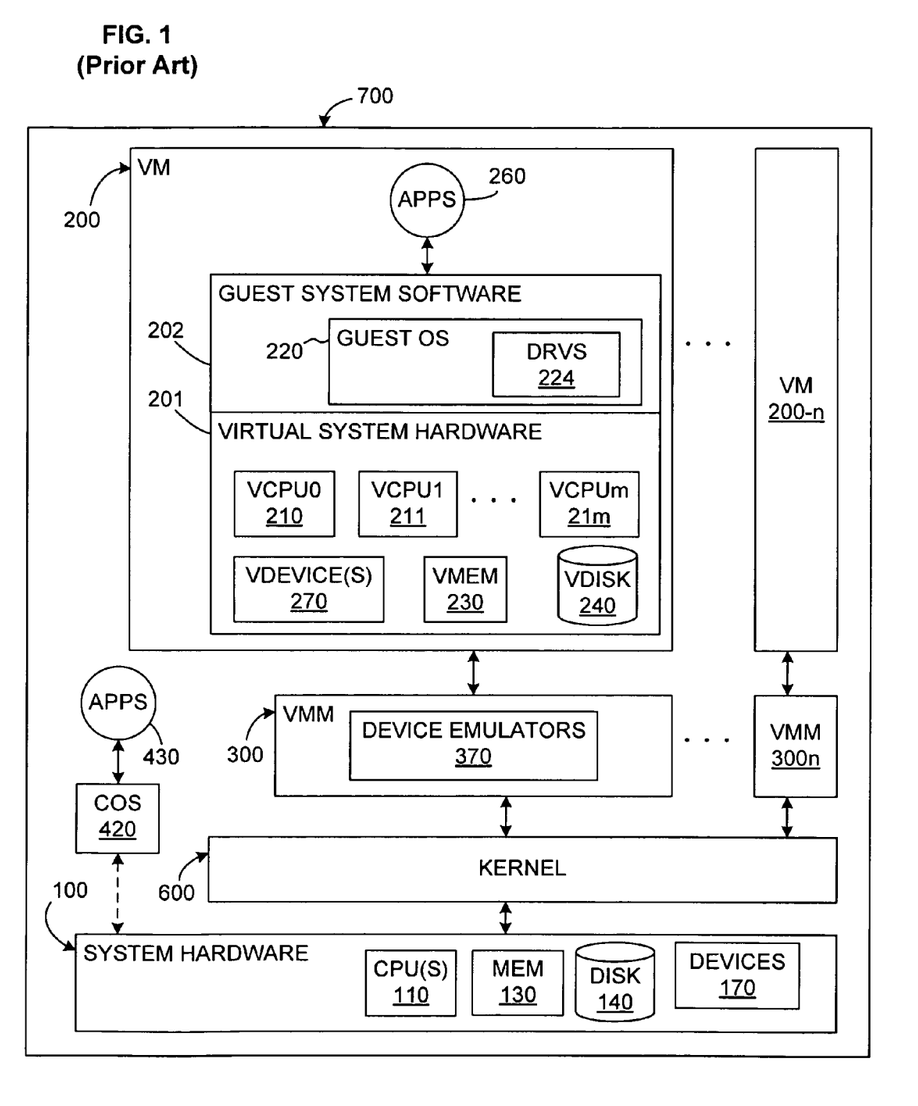
FIG. 1 shows one example of a virtualized computer system on which the present invention can operate.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270.

Note that a single VM may be configured with more than one virtualized processor. To permit computer systems to scale to larger numbers of concurrent threads, systems with multiple CPUs have been developed. These symmetric multiprocessor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210, 211, ..., 21m (VCPU0, VCPU1, ..., VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software—use of the term "virtual machine monitor" is for the sake of simplicity and is not meant in exclusion of software components (one or more) that perform the same functions of the invention described below but are designated with some other name, such as "hypervisor."

Moreover, FIG. 1 shows virtual machine monitors that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s), the virtual memory 230, the virtual disk 240, and the virtual device(s) 270, are shown as being part of the VM 200 for the sake of conceptual simplicity. In actuality, these "components" are usually implemented as software emulations 330 included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

Virtual machines are one type of process that utilizes the resources of a computer system. A virtual machine executing on a computer system will typically be limited to the resources (such as memory, CPU, network bandwidth, and so on) of that computer system. As described above, multiple virtual machines can execute on a computer system. A first group of virtual machines executing on a first computer system typically share the resources of the first computer system. A group of virtual machines executing on a second computer system typically share the resource of the second computer system. The performance of a virtual machine will depend on the resources of the computer system on which it is executing, as well as the demands of other virtual machines executing on the same computer system. It is desirable that virtual machines be assigned to computer systems in a manner that balances the loads of the virtual machines among the various computer systems.

Therefore, what is needed is a method for balancing processes among multiple computer systems.

SUMMARY OF THE INVENTION

The invention is a method for balancing processes among multiple computer systems. In one embodiment, the allocation policies and resource demands of multiple processes executing on multiple computer systems are used to determine the resource imbalance of the computer systems. Resource imbalance can be used to determine whether a process should be migrated from one computer system to another.

In a further embodiment, resource imbalance of multiple resources can be combined to determine the overall imbalance of the computer systems. Overall imbalance can be used to determine whether a process should be migrated from one computer system to another.

In one embodiment, allocation policy and resource demands are used to determine the dynamic entitlement of at least two processes executing on a first computer system. The allocation policy and resource demands of a first process are used to determine the dynamic entitlement of the first process for a first resource. Allocation policy and resource demands of a second process are used to determine the dynamic entitlement of the second process for the first resource. The entitlements of the first and second processes for the first resource are used to determine the normalized entitlement of the first computer system for the first resource. The normalized entitlements for the first resource of multiple computer systems can be used to determine the resource imbalance. In one embodiment, the resource imbalance of multiple resources can be combined to determine the overall imbalance.

In one embodiment, allocation policy and resource demands are used to determine the dynamic entitlement of processes executing on a second computer system. The entitlements for these processes to the first resource can be used to determine the normalized entitlement of the second computer system for the first resource. The resource imbalance can depend both on the normalized entitlement of the first computer system and the normalized entitlement of the second computer system.

Imbalance of resources can be determined for processor time, memory, bandwidth, and storage. Other examples of resource imbalances that may be beneficial to mitigate with migration will be apparent to one of ordinary skill in the art without departing from the scope of the present invention.

In one embodiment, virtual machines are balanced among multiple computer systems operating in a cluster of computer systems. The allocation policies and resource demands of various virtual machines executing on the computer systems of the cluster are used to determine a metric of the resource imbalance of the cluster. Resource imbalance can be used to determine whether a virtual machine should be migrated from one computer system to another. A virtual machine can be migrated in response to the resource imbalance.

In a further embodiment, resource imbalance of multiple resources can be combined into a metric of the overall imbalance of the cluster. Overall imbalance can be used to determine whether a virtual machine should be migrated from one computer system to another. A virtual machine can be migrated responsive to the overall imbalance.

In one embodiment, overall imbalance is compared to a threshold to determine if a process should be migrated. The threshold can be static or dynamic. According to one embodiment of the present invention, the threshold is based on user input. In a further embodiment, the threshold is based on the number of computer systems in the cluster.

BRIEF DESCRIPTION OF THE DRAWINGS

FIGS. 4(*a*) and 4(*b*) illustrate migration of a source virtual machine to a destination virtual machine, according to one embodiment of the present invention.

DETAILED DESCRIPTION

A preferred embodiment of the present invention is now described with reference to the figures where like reference numbers indicate identical or functionally similar elements.

Figure 2:
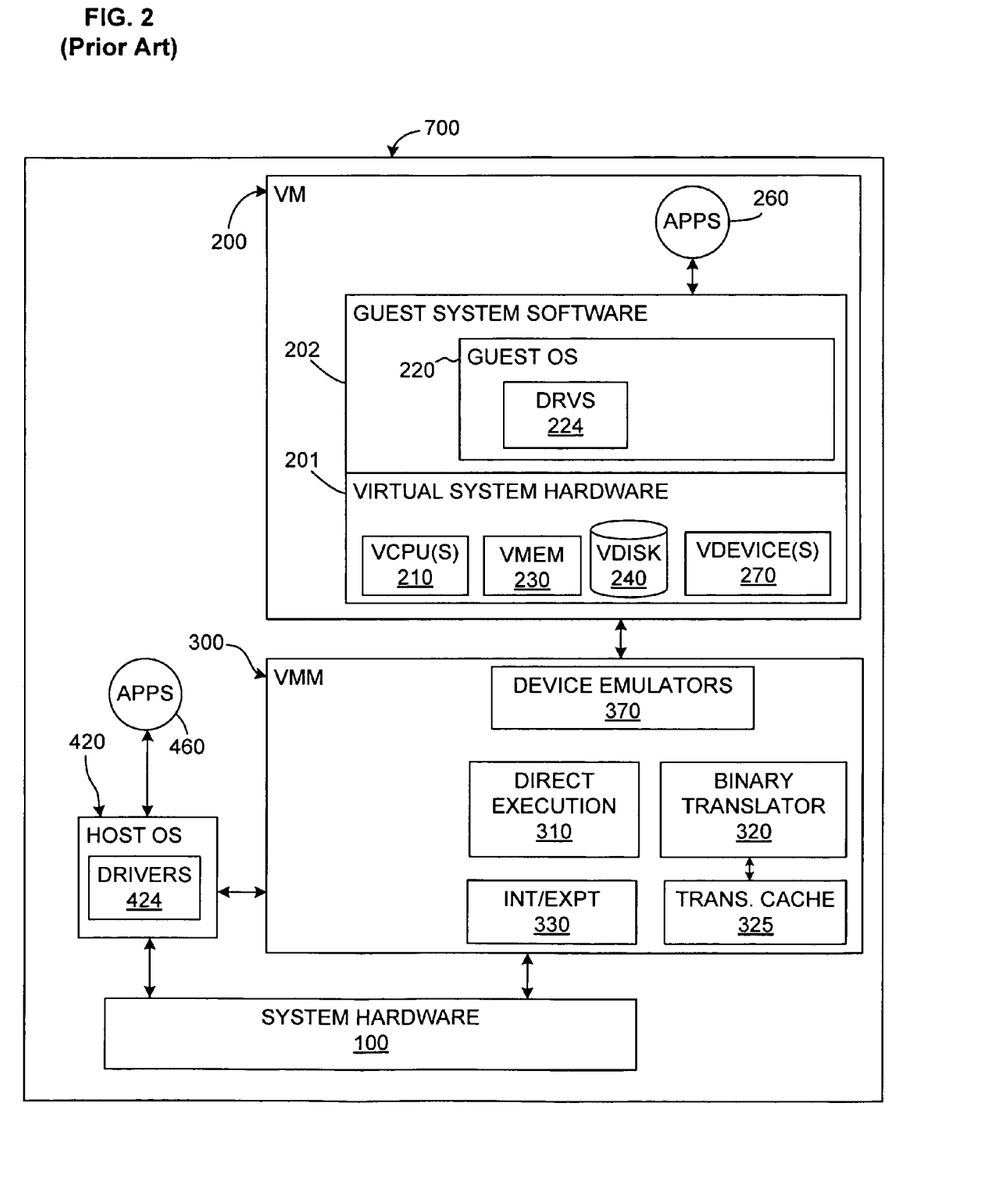
FIG. 2 shows another example of a virtualized computer system on which the present invention can operate.

As described above, FIGS. 1 and 2 depict hosted and non-hosted implementations of virtualized machines. The invention is applicable at least to both such implementations of virtualized machines, as well as para-virtualized computer machines. Virtual machines are described herein as a particular embodiment of processes that can be advantageously balanced and migrated in a cluster of computer systems.

Other embodiments of the present invention are also applicable other kinds of processes, and can be implemented in non-virtualized computer systems. A process can be any set of computer instructions that uses computer system resources. For example, a process can be implemented as a thread, a program, a job, a task, a partition, a capsule, a software object, and so on. Other examples of computer instructions that use computer system resources will be apparent to one of ordinary skill in the art without departing from the scope of the present invention. For the purposes of illustration, throughout this description reference is frequently made to particular embodiments related to balancing and migration of virtual machines. It should be noted that the invention is not limited to such embodiments, and that similar systems and methods may be used for embodiments directed to balancing and migrating other kinds of processes.

Processes are balanced based on allocation policy, resource demand, and the availability of resources provided by computer systems. Balancing can be applied to computer resources such as processor time, memory, network bandwidth (including any type of input/output or bus bandwidth), storage, power consumption, cache space, software licenses, and so on. Other examples of resources to which process balancing can be applied will be apparent to one of ordinary skill in the art without departing from the scope of the present invention.

Figure 3:
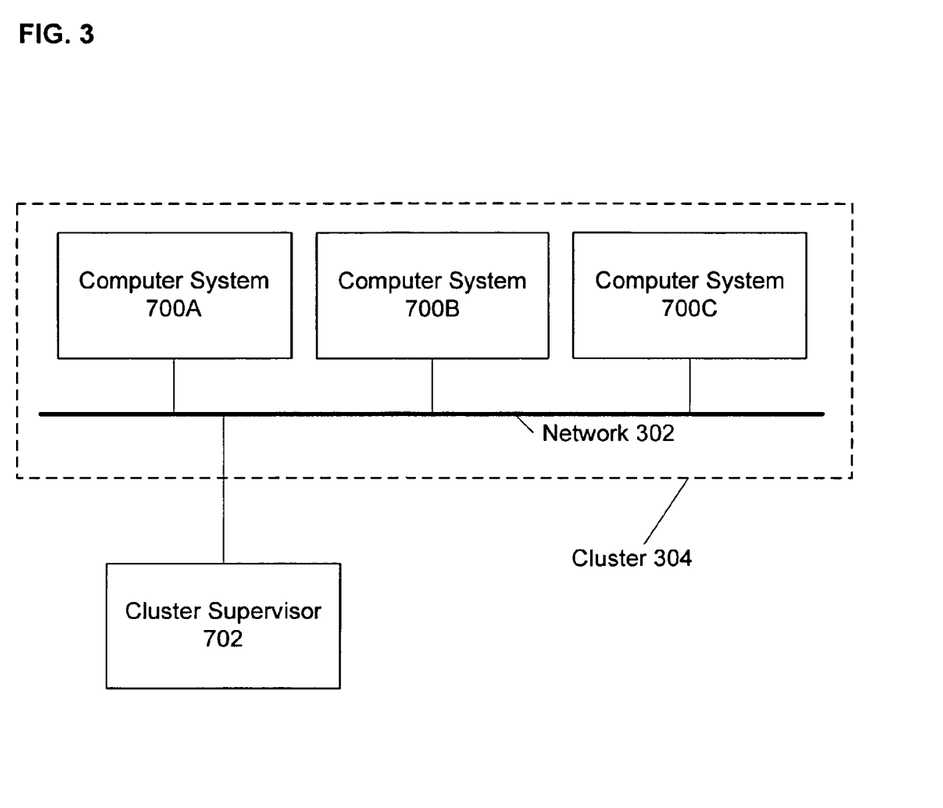
FIG. 3 illustrates a cluster of computer systems, according to one embodiment of the present invention.

FIG. 3 illustrates a cluster of computer systems, according to one embodiment of the present invention. A cluster is a group of one or more computer systems 700. In the example illustrated, the cluster 304 includes computer systems 700A, 700B, and 700C. (A cluster including three computer systems has been shown for the purpose of illustration, but other numbers of computer systems can be included in a cluster without departing from the scope of the present invention.)

The computer systems 700 of the cluster 304 are connected by a network 302. In one embodiment, the network 302 includes a storage area network (SAN), facilitating the sharing of storage devices among the computer systems 700. The network 302 allows data to be transferred among the computer systems 700 of the cluster 304.

In one embodiment, a cluster supervisor 702 is connected to one or more of the computer systems 700 via the network 302. A cluster supervisor 702 is a computer system exercising supervisory responsibilities over resource scheduling of one or more of the computer systems 700 of the cluster 304. For example, the cluster supervisor 702 may be implemented as a computer system running VMware VirtualCenter, available from VMware, Inc., of Palo Alto, Calif. The cluster supervisor 702 can execute a computer program to facilitate resource scheduling of the computer systems 700. The VMware Distributed Resource Scheduler product available from VMware, Inc., of Palo Alto, Calif., is one example of such a computer program.

The cluster supervisor 702 can monitor the computer systems 700 to determine resource demand and usage by various processes executing on the computer systems 700. As another example, the cluster supervisor 702 can receive metrics of resource demand and usage from the various computer systems 700 to evaluate resource allocation decisions. In one embodiment, the cluster supervisor 702 maintains a tree of resources pools to facilitate allocation policy of computer system resources to various processes. A tree of resource pools, according to one embodiment of the present invention, is described herein with reference to FIG. 5.

In one embodiment, the cluster supervisor 702 balances the processes executing on at least some of the computer systems 700 of the cluster 304. For example, the cluster supervisor 702 can instruct a computer system 700 to adjust its allocation of resources to a particular process. As another example, the cluster supervisor 702 can initiate a migration of a process from a first computer system to a second computer system. Advantageously, the cluster supervisor 702 can react dynamically to changes in resource demand in the cluster and adjust allocation of computer system resources accordingly. A method for balancing processes in a cluster of computer systems, according to one embodiment of the present invention, is described herein with reference to FIG. 6.

For the purposes of illustration, the cluster supervisor 702 has been shown as separate from the computer systems 700 of the cluster 304. In one embodiment, the structures and functions of a cluster supervisor can be included in a computer system 700 of the cluster. Thus, one (or more) of the computer systems 700 can play a supervisory role in balancing of processes, while also executing migratable processes of its own. Furthermore, in one embodiment, the structures and functions of a cluster supervisor can be included in a virtual machine executing in a computer system 700 of the cluster. The cluster supervisor itself can be implemented as a migratable process.

As described above, a computer system 700 can execute one or more virtual machines. A virtual machine is one embodiment of a process which can be executed, balanced, and/or migrated. Embodiments of the present invention directed towards balancing of virtual machines are particularly beneficial, as virtual machines generally have well-defined resource requirements, an expectation to be highly robust, and can be implemented as migratable processes.

Figure 4A:
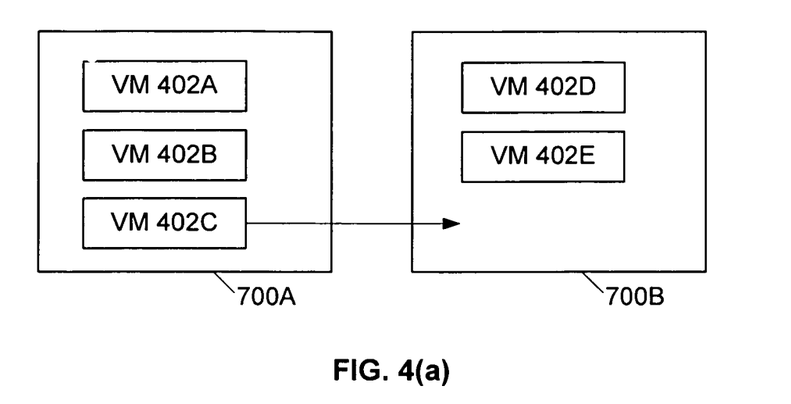
Figure 4B:
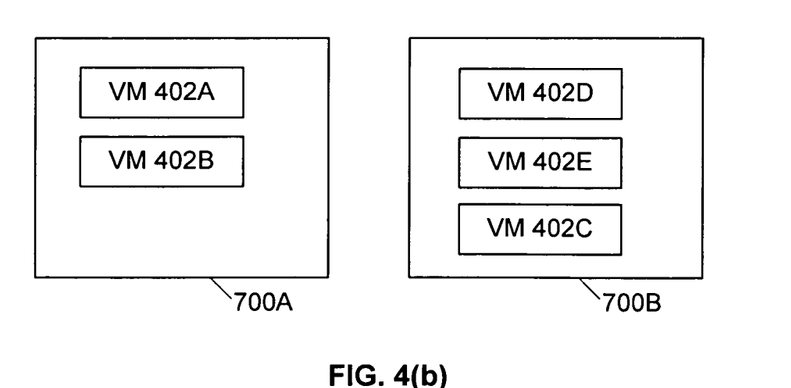

FIGS. 4(a) and 4(b) illustrate migration of a source virtual machine to a destination virtual machine, according to one embodiment of the present invention. As shown in FIG. 4(a), computer system 700A executes three virtual machines: VM 402A, VM 402B, and VM 402C. Computer system 700B executes VM 402D and VM 402E. In the example illustrated, VM 402C is migrated from computer system 700A to computer system 700B.

FIG. 4(b) illustrates the result of the migration of VM 402C. Computer system 700A executes VM 402A and VM402B, and computer system 700B executes VM 402D, VM 402E, and VM 402C. Typically, migrating a virtual machine from a first computer system to a second computer system includes transferring memory and non-memory state data from a source virtual machine to a destination virtual machine, halting execution of the source virtual machine, and resuming execution on the destination virtual machine. Various methods for migrating virtual machines are described in U.S. patent application Ser. No. 10/319,217 filed on Dec. 12, 2002; entitled "Virtual Machine Migration" by Mike Nelson, which is hereby incorporated by reference in its entirety. Migrating virtual machines beneficially facilitates dynamic rebalancing of virtual machines in a cluster. A process (such as a virtual machine) can be migrated to a computer system in the same cluster, but need not be.

Advantageously, different virtual machines can be given different priorities for distribution of cluster resources. The priorities and rules for allocation of resources to a virtual machine are referred to as the "allocation policy" for that virtual machine. Allocation policies can be configured (for example, by a user) to reflect the differing requirements and relative priorities of the virtual machines in a cluster. A first virtual machine can be configured with a particular allocation policy, and second virtual machine can be configured with a different allocation policy.

In one embodiment, an allocation policy can be described in terms of reservation, limit, and shares. A reservation indicates the minimum allocation of a resource that should be available to the virtual machine. For example, a reservation could specify a minimum allocation of 500 MB of RAM, or, another example, 300 megahertz (MHz) of processor time. A limit indicates the maximum allocation of a resource that should be available to the virtual machine. For example, a limit could specify a maximum allocation of 4 gigabytes (GB) of RAM, or, as another example, 2 gigahertz (GHz) of processor time. Reservations and limits are typically given in concrete resource units, and specify resource allocation requirements that are expected to be met regardless of the resource allocation requirements of other virtual machines. In one embodiment, if a computer system does not have adequate resources available to meet the reservation requirement of a virtual machine, the computer system will avoid executing that virtual machine. An admission control process, for example, can be used to determine if the reservation requirements are met before allowing the power-on (or migration) of a virtual machine.

Shares indicate the relative priority of a virtual machine for entitlement to a resource. In the example illustrated in FIG. 4(b), both VM402A and VM402B use the resources of computer system 700A. The relative number of shares held by VM402A and VM402B will affect how the resources of computer system 700A are divided, subject to the respective reservation and limits of VM402A and VM402B. In a simplified model, if VM402A holds four shares for every one share held by VM402B, VM402A would be entitled to four times the resource as VM402B (assuming such an allocation would satisfy the reservation and limit requirements of the affected virtual machines.) In more sophisticated models, the share-based allocation of resources can also be influenced by the estimated degree to which resources allocated to a virtual machine are idle. For example, the shares of a particular virtual machine can be "taxed" by a rate dependent on the resource utilization of the virtual machine. Further discussions of reservation, limit, and share-based allocation of resource are included in U.S. patent application Ser. No. 09/952,796 filed Sep. 12, 2001, entitled "Proportional Share Resource Allocation with Reduction of Unproductive Resource Consumption" by Carl Waldspurger.

The allocation policy (for example, reservation, limit, and shares) of a virtual machine can be used to determine the entitlement of the virtual machine. In one embodiment, the entitlement of a virtual machine is also based on the estimated demand ("demand") of the virtual machine for a particular resource. Entitlement based on demand is referred to as "dynamic entitlement". Given the same reservation and number of shares, two virtual machines could have different dynamic entitlements based on their respective estimated demand for the resource.

Demand for various resources can be estimated using a variety of techniques. In one embodiment, demand for memory by a virtual machine is estimated based on the current working set of a virtual machine plus some percentage of idle memory. In another embodiment, demand for processor time by a virtual machine is estimated based on the time that a virtual machine runs on a processor of the computer system (the "running time"). In yet another embodiment, demand for processor time by a virtual machine is estimated based on the running time and on the time that a virtual machine is ready to be run (i.e. "queued" or "runnable") but not scheduled to execute on the processor (the "ready time"). For example, demand can be estimated as the sum of the running time and the ready time. As another example, demand can be estimated as the sum of the running time and the ready time, wherein the ready time is weighted by a scale factor. The scale factor can reflect an estimate of the percentage of ready cycles that would have been used by the virtual machine had the processor been available. For example, the scale factor can be determined based on the ready time divided by the sum of the ready time and the time that a virtual machine does not have instructions ready or executing on the processor (the "idle time").

In one embodiment, demand can also be estimated based on recently observed demands. For example, demand can be estimated based on a weighted moving average. In another embodiment, demand can also be estimated based on expected future demands as predicted by historical data. For example, demand from a virtual machine could be forecast to be high at the start of a business day based on a historical pattern of resource demand at the start of past business days.

The examples of demand estimation have been provided for the purpose of illustration and are not limiting. Other examples of techniques for estimating resource demand for these and other resources will be apparent to one of ordinary skill in the art without departing from the scope of the present invention.

Dynamic entitlement can be determined based on the allocation policy and the resource demand. In one embodiment, allocation policy is given in terms of reservation, limit and shares. In another embodiment, allocation policy can be based on static or dynamic priorities. A priority is a numeric value assigned to a process. Processes with equivalent priority are given equal access to resources. Resources are preferentially allocated to the highest priority processes that can use them. Priorities can also be dynamically adjusted to avoid starving low-priority processes, and the allocation of a process can be temporarily boosted, for example, when the process becomes runnable after waiting for some event. These examples have been provided for the purpose of illustration and are not limiting. A variety of allocation policies can be implemented without departing from the scope of the present invention. For the purposes of illustration, a method for determining dynamic entitlement based on shares is described, but dynamic entitlement can also be determined based on other implementations of allocation policy.

Dynamic entitlement can be determined by considering the shares of the various virtual machines contending for a particular resource on a computer system (or in a cluster) and the resource demand exerted by those virtual machines. Resource allocation is optimal when the amount of the dynamic entitlement to a resource (possibly weighted by some tax rate) per share is equal for all of the virtual machines contending for the resource on the computer system (or in the cluster), subject to the constraints of reservation, limit, and demand of the various virtual machines. Demand can be implemented as an additional limit constraint. Because dynamic entitlement is limited by demand, dynamic entitlement will tend not to allocate resources to a virtual machine that is unlikely to be used. Furthermore, as dynamic entitlement is determined based on both allocation policy and estimated demand, two virtual machines with the same allocation policy may have different dynamic entitlements. Advantageously, between two virtual machines of equal importance, dynamic entitlement will favor the virtual machine making fuller use of its allocated resources.

Figure 5:
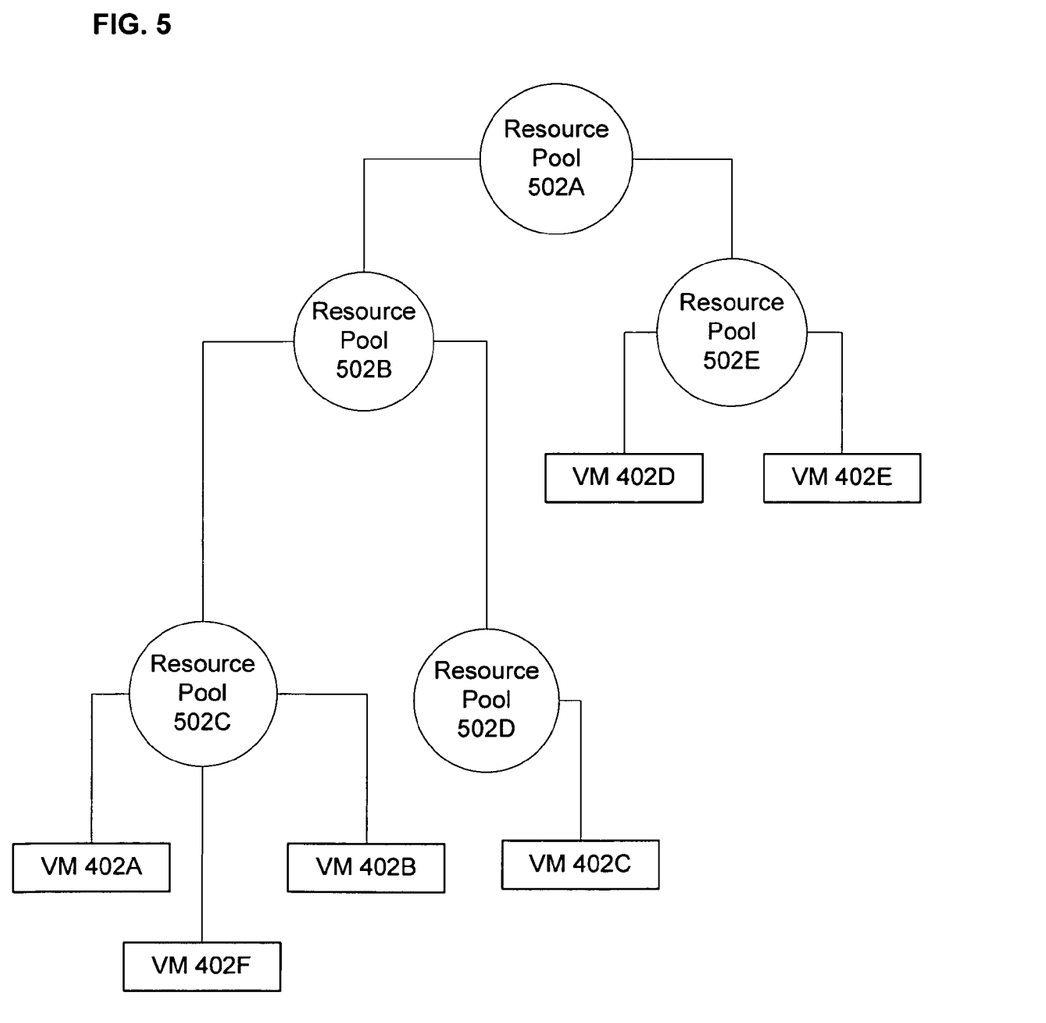
FIG. 5 illustrates a tree of resource pools, according to one embodiment of the present invention.

FIG. 5 illustrates a tree of resource pools, according to one embodiment of the present invention. According to one embodiment of the present invention, a tree of resource pools is maintained by a cluster supervisor 702. In the example illustrated, a tree of resource pools is used to organize allocation policies of virtual machines, but according to various embodiments of the present invention, a tree of resources pools can also be used to organize allocation policies of various kinds of processes, including non-virtualized processes. Other models can also be used to organize allocation policies of various processes without departing from the scope of the present invention.

A resource pool is an abstraction for organizing allocation policy for one or more computer resources. A resource pool provides resources to zero or more child resource pools. Resource pool 502A, for example, is associated with a specific resource requirement (used herein as an example of an allocation policy). The resource requirement of resource pool 502A is used to support the resource requirements of child resource pools 502B and 502E. As a simple example, resource pool 502A could include a reservation of 500 megabytes (MB) of RAM. Resource pool 502B could include a reservation of 300 MB of RAM, and resource pool 502E could include a reservation of 100 MB of RAM. The resource pool 502A specifies a resource requirement sufficient for all child resource pools of resource pool 502A.

A virtual machine can be associated with a particular resource pool. In the example illustrated, VM402A, VM 402B, and VM402F are associated with resource pools that are each children of resource pool 502C. (In the figure, a resource pool associated with a virtual machine is shown as a rectangle, and is labeled with the identifier of its associated virtual machine.) For example, resource pool 502C could include a reservation of 200 MB of RAM. The resource pool associated with VM 402A could include a reservation of 90 MB of RAM, the resource pool associated with VM 402B could include a reservation of 60 MB of RAM, and the resource pool associated with 402F could include a reservation of 50 MB of RAM. Thus a tree of resource pools can be used to specify how computer resources should be shared by a plurality of virtual machines.

In one embodiment, a root resource pool (in this example, the resource pool 502A) is backed by the combined computer system resources of a cluster 304. The resource pool 502A can represent the total available resources of the cluster 304. At each level descending down the resource pool tree, the total available resources of the cluster 304 are further divided into one or more sub-pools. The cluster resources are divided, for example, between the resource pool 502B and the resource pool 502E. In turn, the resources of the resource pool 502E are divided between the VM 402D and the VM402E, and the resources of the resource pool 502B are divided between the resource pool 502C and the resource pool 502D. The resources of the resource pool 502C are further divided among the various resource pools associated with the VM 402A, VM 402B, and the VM 402F. The resources of the resource pool 502D are divided to the VM402C. Hence the resources of the cluster can be divided into resources pools and further subdivided to the resource requirements of particular virtual machines.

A tree of resource pools advantageously facilitates the allocation of aggregate cluster resources to groups of virtual machines. Such a structure allows the hierarchical organization and assignment of cluster resources. Furthermore, resource pools can be used to isolate allocation policies of one group of virtual machines from allocation policies of another group of virtual machines. Isolation of allocation policies may be beneficial, for example, for granting users limited authority to adjust allocation policy or for insulating the performance of a first set of virtual machines from the demands of a second set of virtual machines. Resource pool admission control can be used to determine if adequate resources are available before powering-on (or migrating) the virtual machines of a pool.

Figure 6:
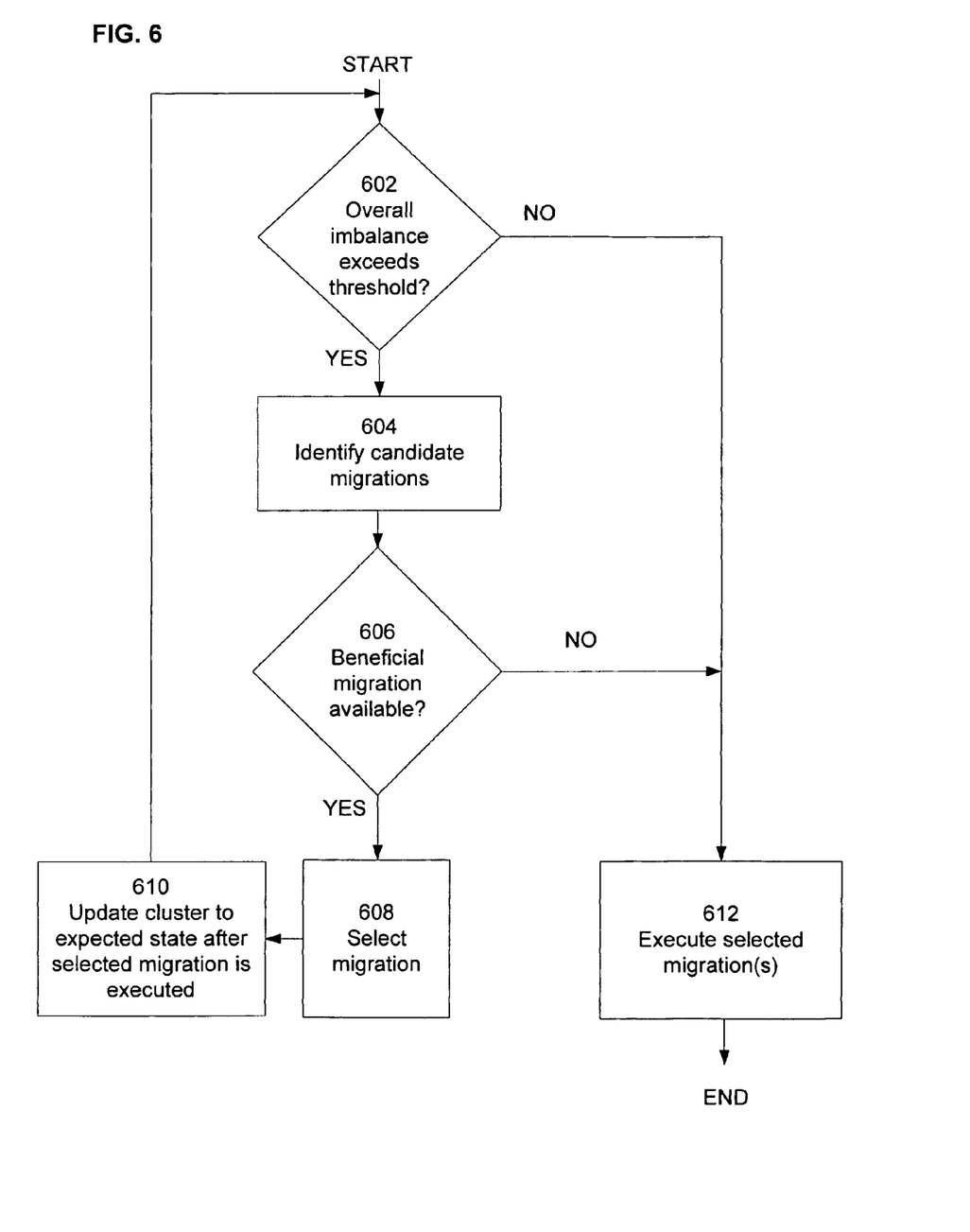
FIG. 6 illustrates a method for balancing processes in a cluster of computer systems, according to one embodiment of the present invention.

FIG. 6 illustrates a method for balancing processes in a cluster of computer systems, according to one embodiment of the present invention. In one embodiment, the method is executed by a cluster supervisor 702. The method can be executed based on the overall imbalance, in response to the expiration of an event counter (such as a timer), or in response to another event.

The cluster supervisor 702 determines 602 if the overall imbalance of the cluster exceeds a threshold. In another embodiment, the cluster supervisor 702 determines 602 if the resource imbalance of the cluster exceeds a threshold. A method for determining resource imbalance, overall imbalance, and threshold, according to various embodiments of the present invention, are described herein with reference to FIG. 7.

If the overall imbalance of the cluster exceeds the threshold, the cluster supervisor 702 identifies 604 candidate migrations. In one embodiment, candidate migrations are identified 604 by considering whether a virtual machine (as an implementation of a process) would be able to execute if migrated to a particular computer system. If a computer system would have adequate resources to satisfy resource reservations, the virtual machine is compatible with the computer system architecture, and the migration would be consistent with other placement policies (such as affinity/anti-affinity rules), the migration of the virtual machine to the computer system would be considered a candidate migration. In one embodiment, identifying 604 a candidate migration further comprises determining the effect a migration would have on overall imbalance. In another embodiment, identifying 604 a candidate migration comprises determining the effect a migration would have on resource imbalance.

The cluster supervisor 702 determines 606 if a beneficial migration is available. A migration can be considered beneficial if the migration would result in an improvement in the overall imbalance (or the resource imbalance). As another example, a migration can be considered beneficial if the migration would result in an improvement in the overall imbalance (or resource imbalance) that is greater than some overhead threshold. For example, the cluster supervisor 702 can consider the cost of performing a migration in determining if the migration is beneficial. The cost of a migration can be estimated, for example, based on a fixed estimate, observed past migrations, or using an analytic model. As yet another example, a migration can be considered beneficial if the migration would result in an improvement in resource availability.

If the cluster supervisor 702 determines 606 that a beneficial migration is available, the cluster supervisor 702 selects 608 a migration. For example, the cluster supervisor 702 can select the migration that would provide the greatest improvement in overall imbalance (or resource imbalance) if executed. The cluster supervisor 702 can also select migrations strategically, for example, by selecting a set of migrations that would provide substantial improvement in overall imbalance (or resource imbalance), even though a subset of the set of migrations would provide little (or even negative) overall imbalance (or resource imbalance) improvement. In one embodiment, the cluster supervisor 702 selects 608 multiple migrations, such as swaps and three-way moves.

In one embodiment, the cluster supervisor 702 updates 610 the cluster to the expected state after the selected migration is executed. For example, the dynamic entitlement can be considered the responsibility of the computer system to which the process was migrated in subsequent determinations of overall imbalance (or resource imbalance). The cluster supervisor 702 determines the overall imbalance (or resource imbalance) of the cluster with the selected migration taken into account. The cluster supervisor 702 returns to determining 602 if the overall imbalance exceeds the threshold.

If the overall imbalance does not exceed the threshold, or if no beneficial migration is available, the cluster supervisor 702 executes 612 the selected migration(s), if any have been selected. The cluster supervisor 702 can execute 612 the selected migrations by directing the computer systems of the cluster to migrate the appropriate virtual machine(s), for example, as described above with reference to FIGS. 4(a) and 4(b). In one embodiment, the selected migration(s) are displayed to a user for recommendation and/or review. In a further embodiment, the selected migration(s) are executed responsive to a user command.

Figure 7:
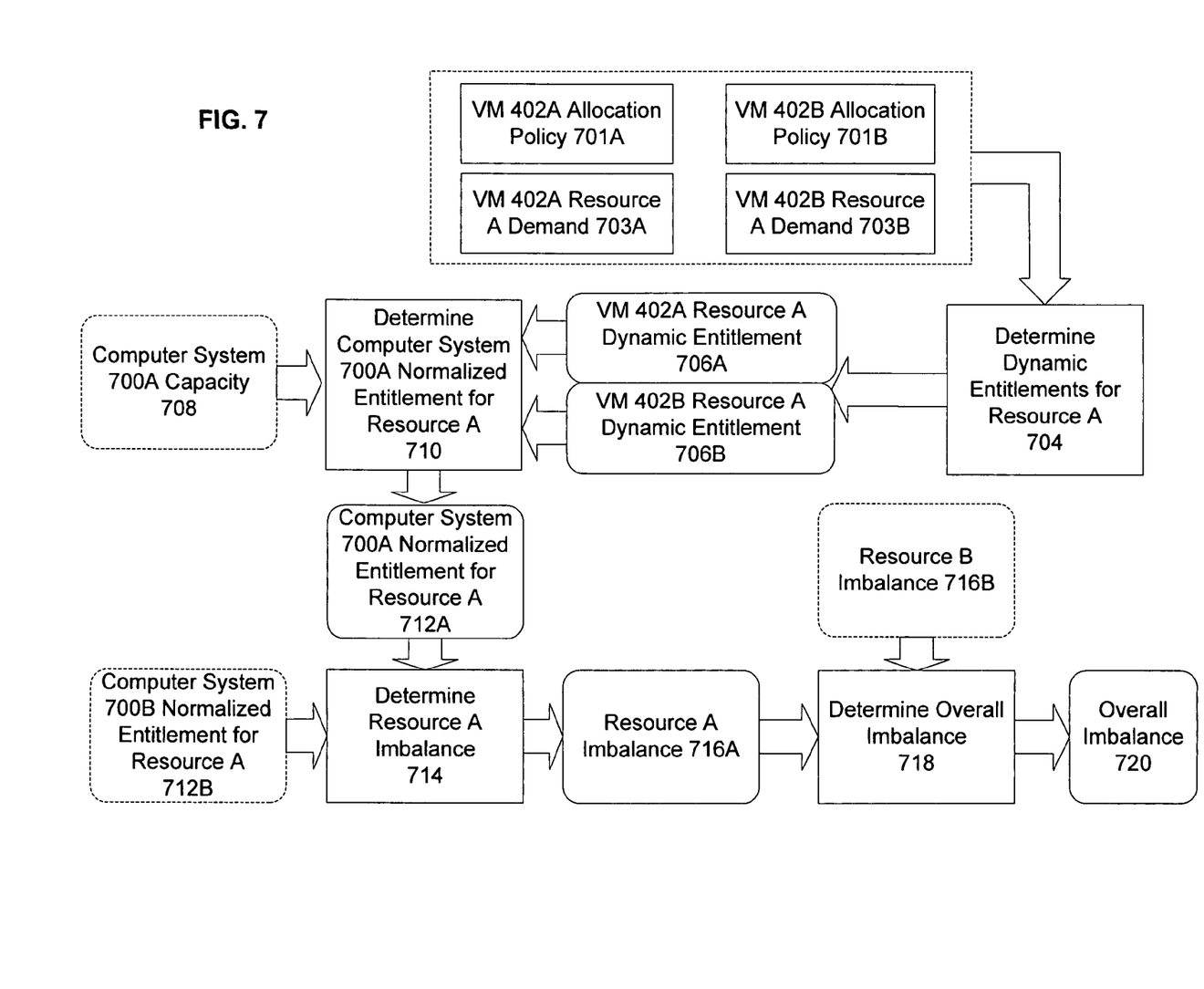
FIG. 7 illustrates a method for determining overall imbalance of virtual machine resources, according to one embodiment of the present invention.

FIG. 7 illustrates a method for determining overall imbalance of virtual machine resources, according to one embodiment of the present invention. In one embodiment, the method is performed by the cluster supervisor 702. In another embodiment, the method is performed by one or more computer systems of the cluster. In yet another embodiment, some of the steps of the method are performed by various computer systems of the cluster, the results of which are transferred to the cluster supervisor 702, which performs other steps of the method. Other techniques for executing the method in a cluster of computer systems will be apparent to one of ordinary skill in the art without departing from the scope of the present invention.

The cluster supervisor 702 uses allocation policies and resource demands to determine dynamic entitlement. The allocation policies can be organized, for example, in a resource pool tree. In the example illustrated, dynamic entitlements are determined based on VM 402A allocation policy 701A, VM 402B allocation policy 701B, VM 402A resource A demand 703A and VM 402B resource B demand 703B. As described above, an allocation policy can be described using a reservation, limit, and/or shares, or it can be described in another manner. Resource demands reflect the actual or estimated use of resources by a virtual machine.

The cluster supervisor 702 determines 704 dynamic entitlements for resource A. In one embodiment, the cluster supervisor 702 determines 704 dynamic entitlement by distributing resource A by shares, subject to the reservations, limits, and resource demands of the virtual machines. The cluster supervisor 702 determines 704 VM 402A dynamic entitlement 706A and VM 402B dynamic entitlement 706B.

In the example illustrated, virtual machine 402A and virtual machine 402B are executing on computer system 700A. Computer system 700A has a capacity 708 indicating the supply of resource A to be shared by the various virtual machines executing on the computer system 700A.

Based on the VM 402A dynamic entitlement 706A, the VM 402B dynamic entitlement 706B, and the computer system 700A capacity 708, the cluster supervisor 702 determines 710 the computer system 700A normalized entitlement for resource A. Normalized entitlement can be determined, for example, as the sum of the entitlements of the virtual machines executing on a computer system divided by the capacity of the computer system. Normalized entitlement can be any metric indicating the relationship between dynamic entitlements of one or more processes executing on a computer system and the capacity of the computer system. The computer system 700A normalized entitlement for resource A 712A reflects the relative commitment of computer system 700A's resource A. In one embodiment, normalized entitlement can be scaled based on conditions occurring on the computer system, such as detected memory overcommitment, i.e. thrashing.

In a similar series of steps (not shown), the computer system 700B normalized entitlement for resource A 712B is determined. Computer system 700B is typically another computer system in the same cluster as computer system 700A. In one embodiment, normalized entitlement for resource A is determined for all computer systems 700 in the cluster 304.

The cluster supervisor 702 determines 714 resource A imbalance based on the computer system 700A normalized entitlement for resource A 712A and the computer system 700B normalized entitlement for resource A 712B. In one embodiment, the cluster supervisor 702 determines 714 resource A imbalance based on the standard deviation of the normalized entitlements for resource A of the various computer systems of the cluster. Resource A imbalance 716A can be any metric describing the distribution of normalized entitlements of one or more computer systems. Advantageously, resource imbalance can be compared to a static or dynamic threshold to determine whether a migration should be performed, or to test the potential benefit of a migration, as described herein with reference to FIG. 6.

In one embodiment, in a similar series of steps (not shown), resource B imbalance 716B is determined. The resource A imbalance 716A is combined with resource B imbalance 716B to determine 718 overall imbalance. A method for combining resource imbalances to produce overall imbalance is described herein with reference to FIG. 8. Overall imbalance 720 can be any metric based on the resource imbalance of one or more resources. Advantageously, overall imbalance can be compared to a static or dynamic threshold to determine whether a migration should be performed, or to test the potential benefit of a migration, as described herein with reference to FIG. 6.

In various embodiments, resource imbalance and/or overall imbalance are compared to a threshold to determine whether a migration should be performed. The threshold can be static or dynamic. According to one embodiment of the present invention, the threshold is based on user input. In a further embodiment, the threshold is based on the number of computer systems in the cluster. For example, the threshold t can be given as:

$$t(x,n)=k*x\sqrt{n/c}$$

where k and c are scale factors, x is a term of user input, and n is the number of computer systems in the cluster. In one implementation, 0.1 is used as a value of k, and 2 is used as a value of c. For simplicity to a user, the user input x is sometimes given as an integer between 1 and 5. In one embodiment, the user input x is given for a small or fixed-size cluster, such as a cluster with two computer systems.

A threshold based on the number of computer systems in a cluster advantageously facilitates a consistent migration experience for a user. For example, given a constant user input setting and similar loads, migrations should be recommended with a similar frequency in either a large or small cluster.

Figure 8:
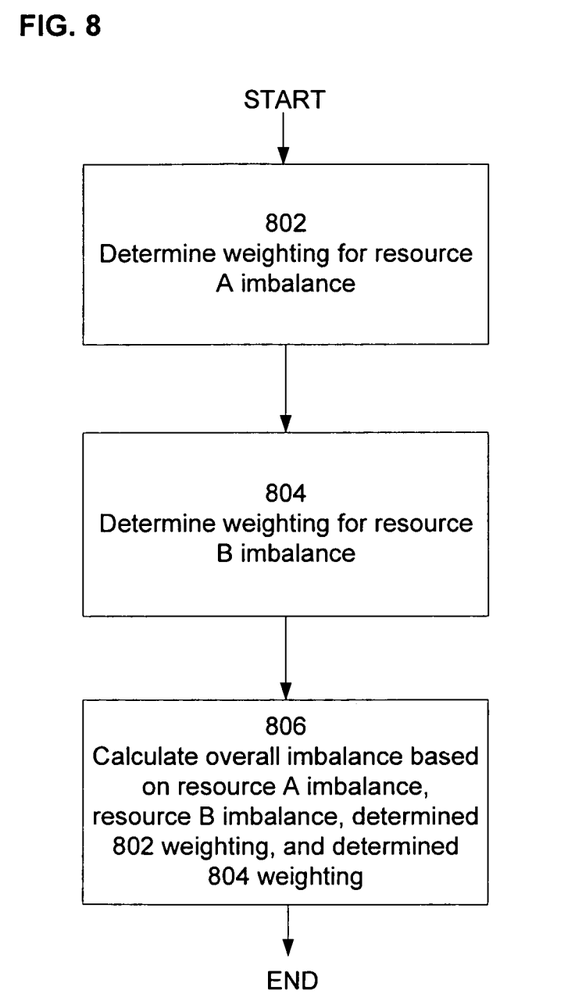
FIG. 8 illustrates a method for calculating overall imbalance based on the imbalance of at least two resource imbalances, according to one embodiment of the present invention.

FIG. 8 illustrates a method for calculating overall imbalance based on at least two resource imbalances, according to one embodiment of the present invention. In one embodiment, the method is performed by the cluster supervisor 702, but the method can be performed by other entities without departing from the scope of the present invention.

The cluster supervisor 702 determines 802 a weighting for resource A imbalance and determines 804 a weighting for resource B imbalance. According to one embodiment of the present invention, the weighting for resource A imbalance and the weighting for resource B imbalance depend on whether any computer systems 700 are overcommitted on resource A or resource B. A computer system 700 is overcommitted on a resource if the dynamic entitlements to the resource of the virtual machines executing on the computer system 700 exceed the available supply of the resource on the computer system 700. In one embodiment, a computer system is identified as being overcommitted on a resource based on the normalized entitlement of the resource for that computer system.

In one embodiment, resource A imbalance represents memory imbalance and resource B imbalance represents processor time imbalance. These examples have been chosen for the purpose of illustration and are not limiting. Any kind of resource imbalance can be combined with any other kind of resource imbalance to determine overall imbalance without departing from the scope of the present invention.

In one embodiment, if memory is overcommitted on any computer system, memory imbalance is given a higher weighting and processor time imbalance is given a lower weighting. Giving memory imbalance a higher weight when memory is overcommitted advantageously prioritizes migrations to improve memory balance, thereby reducing the likelihood of thrashing due to overly constrained memory conditions. If memory is not overcommitted on any computer system, but processor time is overcommitted on any computer system, processor time imbalance is given a higher weighting and memory imbalance is given a lower weighting. Giving processor time imbalance a higher weight when processor time is overcommitted but memory is not overcommitted advantageously prioritizes migrations to improve processor time balance, thereby stressing the importance of the overcommitted resource. If neither memory nor processor time is overcommitted on any computer system, memory imbalance and processor time imbalance are given the same weighting. Giving memory imbalance and processor time the same weighting when neither resource is overcommitted advantageously balances the allocation concerns of both resources. In another embodiment, the weighting of resource A imbalance and resource B imbalance can be configured by a user.

The cluster supervisor 702 calculates 806 the overall imbalance based on the resource A imbalance, the determined 802 weighting for resource A imbalance, the resource B imbalance, and the determined 804 weighting for resource B imbalance. For example, overall imbalance I can be calculated as:

$$I=(w_a*a)+(w_b*b)$$

wherein $w_a$ is the weighting for resource A imbalance, a is the resource A imbalance, $w_b$ is the weighting for resource B imbalance, and b is the resource B imbalance. Calculating the overall imbalance based on resource imbalance and overcommitment-based weighting factors advantageously allows overall imbalance to reflect the resource imbalance of the more critically overcommitted resources.

For the purposes of illustration, a method has been described for calculating overall imbalance based on two resource imbalances. According to one embodiment of the present invention, overall imbalance can be calculated based on any combination of any number of resource imbalances. For example, the sum of resource imbalances shown above can be expanded to include any number of resource imbalances and resource imbalance weightings. Other methods for combining resource imbalance to produce resource imbalance will be apparent to one of ordinary skill in the art without departing from the scope of the present invention.

Therefore, as described herein, a process can be migrated from a first computer system to a second computer system based on the allocation policies and estimated demand of the various processes. Processes can advantageously be executed with differing priorities, and allocation policies can be customized to the particular resource requirements of a process. Furthermore, a process can be migrated in response to a change in resource demand of the same or a different process, thereby facilitating dynamic and adaptable process balancing in a cluster of computer systems.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method for balancing processes, the method comprising:
    determining a dynamic entitlement of a first process for a first resource based on a first allocation policy and an estimate of demand for the first resource by the first process, the first process executing on a first physical computer system;
    determining a dynamic entitlement of a second process for the first resource based on a second allocation policy and an estimate of demand for the first resource by the second process, the second process executing on a second physical computer system;
    determining a normalized entitlement of the first resource on the first physical computer system based on at least the dynamic entitlement of the first process for the first resource and a capacity of the first resource of the first physical computer system;
    determining a normalized entitlement of the first resource on the second physical computer system based on at least the dynamic entitlement of the second process for the first resource and a capacity of the first resource of the second physical computer system;
    determining a resource imbalance of the first resource based on at least the normalized entitlement of the first resource on the first physical computer system and the normalized entitlement of the first resource on the second physical computer system;
    determining a resource imbalance of a second resource;
    determining an overall imbalance based on at least the resource imbalance of the first resource and the resource imbalance of the second resource; and
    if the overall imbalance is greater than a threshold, migrating the first process from the first physical computer system to another physical computer system, wherein the threshold is at least partially defined by a user input number multiplied by a first scale factor and a root function of a number of physical computer systems in a cluster divided by a second scale factor, the first and second physical computer systems being part of the cluster.

2. The method of claim 1, wherein the first resource comprises computer memory.

3. The method of claim 2, wherein the second resource comprises processor time.

4. The method of claim 1, wherein the threshold is defined using the following equation:

$$t(x,n) = k^* x / \sqrt{n/c},$$

where t is the threshold, k and c are scale factors, x is a term of user input, and n is the number of physical computer systems in the cluster.

5. The method of claim 1, wherein the first process is migrated to the another physical computer system based on the resource imbalance and the threshold.

6. The method of claim 5, wherein the threshold is based on user input.

7. The method of claim 1, further comprising:
    determining a dynamic entitlement of a third process for the first resource based on a third allocation policy and an estimate of demand for the first resource by the third process, the third process executing on the first physical computer system.

8. The method of claim 7, wherein the normalized entitlement of the first resource on the first physical computer system is determined based on at least the dynamic entitlement of the first process for the first resource and the dynamic entitlement of the third process for the first resource.

9. The method of claim 7, wherein the normalized entitlement of the first resource on the first physical computer system is determined based on at least the dynamic entitlement of the first process for the first resource, the dynamic entitlement of the third process for the first resource, and the capacity of the first resource of the first physical computer system.

10. The method of claim 1, wherein the normalized entitlement of the first resource on the first physical computer system is determined as a sum of dynamic entitlements of processes executing on the first physical computer system divided by the capacity of the first resource of the first physical computer system.

11. The method of claim 1, wherein the first allocation policy is different than the second allocation policy.

12. The method of claim 1, wherein the first process comprises a first virtual machine.

13. The method of claim 12, wherein the second process comprises a second virtual machine.

14. The method of claim 1, wherein the first resource comprises at least one of computer memory, processor time, network bandwidth and power consumption.

15. The method of claim 1, wherein the first allocation policy used to determine the dynamic entitlement of the first process is based on the number of shares held by the first process, wherein the shares indicate a relative priority of the first process for entitlement to the first resource.

16. The method of claim 1, wherein the first resource comprises memory, and wherein the estimate of demand for the first resource by the first process is based on a current working set of the first process with respect to the memory and a percentage of idle memory.

17. The method of claim 1, wherein the first resource comprises processor time, and wherein the estimate of demand for the first resource by the first process is based on a running time and a ready time, the running time being time that the first process runs on a processor of the first physical computer system, the ready time being time that the first process is ready to be run but not scheduled to execute on the processor.

18. The method of claim 1, wherein the first resource comprises a set of software licenses.

19. The method of claim 1, wherein the second physical computer system is different than the another physical computer system.

20. A method for balancing virtual machines in a cluster of physical computer systems, the method comprising:
   determining a dynamic entitlement of a first virtual machine for a first resource based on a first allocation policy and an estimate of demand for the first resource by the first virtual machine, the first virtual machine executing on a first physical computer system;
   determining a dynamic entitlement of a second virtual machine for the first resource based on a second allocation policy and an estimate of demand for the first resource by the second virtual machine, the second virtual machine executing on a second physical computer system;
   determining a normalized entitlement of the first resource on the first physical computer system based on at least the dynamic entitlement of the first virtual machine for the first resource and a capacity of the first resource of the first physical computer system;
   determining a normalized entitlement of the first resource on the second physical computer system based on at least the dynamic entitlement of the second virtual machine for the first resource and a capacity of the first resource of the second physical computer system;
   determining a resource imbalance of the first resource based on at least the normalized entitlement of the first resource on the first physical computer system and the normalized entitlement of the first resource on the second physical computer system;
   determining a resource imbalance of a second resource;
   determining an overall imbalance based on at least the resource imbalance of the first resource and the resource imbalance of the second resource; and
   if the overall imbalance is greater than a threshold, migrating the first virtual machine from the first physical computer system to another physical computer system, wherein the threshold is based on a user input number multiplied by a first scale factor and a root function of a number of physical computer systems in a cluster divided by a second scale factor, the first and second physical computer systems being part of the cluster.

21. The method of claim 20, wherein the first resource comprises computer memory.

22. The method of claim 21, wherein the second resource comprises processor time.

23. The method of claim 20, wherein the threshold is defined using the following equation:

$$t(x,n)=k^* x \sqrt{n/c},$$

where t is the threshold, k and c are scale factors, x is a term of user input, and n is the number of the physical computer systems in the cluster.

24. The method of claim 20, wherein the first virtual machine is migrated to the another physical computer system based on the resource imbalance and the threshold.

25. The method of claim 24, wherein the threshold is based on user input.

26. The method of claim 20, further comprising:
   determining a dynamic entitlement of a third virtual machine for the first resource based on a third allocation policy and an estimate of demand for the first resource by the third virtual machine, the third virtual machine executing on the first physical computer system.

27. The method of claim 26, wherein the normalized entitlement of the first resource on the first physical computer system is determined based on at least the dynamic entitlement of the first virtual machine for the first resource and the dynamic entitlement of the third virtual machine for the first resource.

28. The method of claim 26, wherein the normalized entitlement of the first resource on the first physical computer system is determined based on at least the dynamic entitlement of the first virtual machine for the first resource, the dynamic entitlement of the third virtual machine for the first resource, and the capacity of the first resource of the first physical computer system.

29. The method of claim 20, wherein the normalized entitlement of the first resource on the first physical computer system is determined as a sum of dynamic entitlements of virtual machines executing on the first physical computer system divided by the capacity of the first resource of the first physical computer system.

30. The method of claim 20, wherein the first allocation policy is different than the second allocation policy.

31. The method of claim 20, wherein the first resource comprises at least one of computer memory, processor time, network bandwidth and power consumption.

32. The method of claim 20, wherein the first allocation policy used to determine the dynamic entitlement of the first virtual machine is based on the number of shares held by the first virtual machine, wherein the shares indicate a relative priority of the first virtual machine for entitlement to the first resource.

33. The method of claim 20, wherein the first resource comprises memory, and wherein the estimate of demand for the first resource by the first virtual machine is based on a current working set of the first virtual machine with respect to the memory and a percentage of idle memory.

34. The method of claim 20, wherein the first resource comprises processor time, and wherein the estimate of demand for the first resource by the first virtual machine is based on a running time and a ready time, the running time being time that the first virtual machine runs on a processor of the first physical computer system, the ready time being time that the first virtual machine is ready to be run but not scheduled to execute on the processor.

35. The method of claim 20, wherein the first resource comprises a set of software licenses.

36. The method of claim 20, wherein the second physical computer system is different than the another physical computer system.

37. A computer program product for balancing processes, the computer program product comprising a non-transitory computer-readable medium containing computer program code for performing the method comprising:
   determining a dynamic entitlement of a first process for a first resource based on a first allocation policy and an estimate of demand for the first resource by the first process, the first process executing on a first physical computer system;
   determining a dynamic entitlement of a second process for the first resource based on a second allocation policy and an estimate of demand for the first resource by the second process, the second process executing on a second physical computer system;
   determining a normalized entitlement of the first resource on the first physical computer system based on at least the dynamic entitlement of the first process for the first resource and a capacity of the first resource of the first physical computer system;
   determining a normalized entitlement of the first resource on the second physical computer system based on at least the dynamic entitlement of the second process for the first resource and a capacity of the first resource of the second physical computer system;
   determining a resource imbalance of the first resource based on at least the normalized entitlement of the first resource on the first physical computer system and the normalized entitlement of the first resource on the second physical computer system;
   determining a resource imbalance of a second resource;
   determining an overall imbalance based on at least the resource imbalance of the first resource and the resource imbalance of the second resource; and
   if the overall imbalance is greater than a threshold, migrating the first process from the first physical computer system to another physical computer system, wherein the threshold is at least partly defined by a user input number multiplied by a first scale factor and a root function of a number of physical computer systems in a cluster divided by a second scale factor, the first and second physical computer system being part of the cluster.

38. The computer program product of claim 37, wherein the first resource comprises computer memory.

39. The computer program product of claim 38, wherein the second resource comprises processor time.

40. The computer program product of claim 37, wherein the threshold is defined using the following equation:

$$t(x,n) = k \ast x \sqrt{n/c},$$

where t is the threshold, k and c are scale factors, x is a term of user input, and n is the number of physical computer systems in the cluster.

41. The computer program product of claim 37, wherein the first process is migrated to the another physical computer system based on the resource imbalance and the threshold.

42. The computer program product of claim 41, wherein the threshold is based on user input.

43. The computer program product of claim 37, the method further comprising:
   determining a dynamic entitlement of a third process for the first resource based on a third allocation policy and an estimate of demand for the first resource by the third process, the third process executing on the first physical computer system.

44. The computer program product of claim 43, wherein the normalized entitlement of the first resource on the first physical computer system is determined based on at least the dynamic entitlement of the first process for the first resource and the dynamic entitlement of the third process for the first resource.

45. The computer program product of claim 43, wherein the normalized entitlement of the first resource on the first physical computer system is determined based on at least the dynamic entitlement of the first process for the first resource, the dynamic entitlement of the third process for the first resource, and the capacity of the first resource of the first physical computer system.

46. The computer program product of claim 37, wherein the normalized entitlement of the first resource on the first physical computer system is determined as a sum of dynamic entitlements of processes executing on the first physical computer system divided by the capacity of the first resource of the first physical computer system.

47. The computer program product of claim 37, wherein the first allocation policy is different than the second allocation policy.

48. The computer program product of claim 37, wherein the first process comprises a first virtual machine.

49. The computer program product of claim 37, wherein the first resource comprises at least one of computer memory, processor time, network bandwidth and power consumption.

50. The computer program product of claim 37, wherein the first allocation policy used to determine the dynamic entitlement of the first process is based on the number of shares held by the first process, wherein the shares indicate a relative priority of the first process for entitlement to the first resource.

51. The computer program product of claim 37, wherein the first resource comprises memory, and wherein the estimate of demand for the first resource by the first process is based on a current working set of the first process with respect to the memory and a percentage of idle memory.

52. The computer program product of claim 37, wherein the first resource comprises processor time, and wherein the estimate of demand for the first resource by the first process is based on a running time and a ready time, the running time being time that the first process runs on a processor of the first physical computer system, the ready time being time that the first process is ready to be run but not scheduled to execute on the processor.

53. The computer program product of claim 37, wherein the first resource comprises a set of software licenses.

54. The computer program product of claim 37, wherein the second physical computer system is different than the another physical computer system.

55. A computer program product for balancing virtual machines in a cluster of physical computer systems, the computer program product comprising a non-transitory computer-readable medium containing computer program code for performing the method comprising:
   determining a dynamic entitlement of a first virtual machine for a first resource based on a first allocation policy and an estimate of demand for the first resource by the first virtual machine, the first virtual machine executing on a first physical computer system;
   determining a dynamic entitlement of a second virtual machine for the first resource based on a second allocation policy and an estimate of demand for the first resource by the second virtual machine, the second virtual machine executing on a second physical computer system;
   determining a normalized entitlement of the first resource on the first physical computer system based on at least the dynamic entitlement of the first virtual machine for the first resource and a capacity of the first resource of the first physical computer system;
   determining a normalized entitlement of the first resource on the second physical computer system based on at least the dynamic entitlement of the second virtual machine for the first resource and a capacity of the first resource of the second physical computer system;
   determining a resource imbalance of the first resource based on at least the normalized entitlement of the first resource on the first physical computer system and the normalized entitlement of the first resource on the second physical computer system;
   determining a resource imbalance of a second resource;
   determining an overall imbalance based on at least the resource imbalance of the first resource and the resource imbalance of the second resource; and
   if the overall imbalance is greater than a threshold, migrating the first virtual machine from the first physical computer system to another physical computer system, wherein the threshold is at least partly defined by a user input number multiplied by a first scale factor and the a root function of a number of physical computer systems in a cluster divided by a second scale factor, the first and second physical computer system being part of the cluster.

56. The computer program product of claim 55, wherein the first resource comprises computer memory.

57. The computer program product of claim 56, wherein the second resource comprises processor time.

58. The computer program product of claim 55, wherein the threshold is defined using the following equation:

$$t(x,n)=k*x\sqrt{n/c},$$

where t is the threshold, k and c are scale factors, x is a term of user input, and n is the number of the physical computer systems in the cluster.

59. The computer program product of claim 55, wherein the first virtual machine is migrated to the another physical computer system based on the resource imbalance and the threshold.

60. The computer program product of claim 59, wherein the threshold is based on user input.

61. The computer program product of claim 55, the method further comprising:
   determining a dynamic entitlement of a third virtual machine for the first resource based on a third allocation policy and an estimate of demand for the first resource by the third virtual machine, the third virtual machine executing on the first physical computer system.

62. The computer program product of claim 61, wherein the normalized entitlement of the first resource on the first physical computer system is determined based on at least the dynamic entitlement of the first virtual machine for the first resource and the dynamic entitlement of the third virtual machine for the first resource.

63. The computer program product of claim 61, wherein the normalized entitlement of the first resource on the first physical computer system is determined based on at least the dynamic entitlement of the first virtual machine for the first resource, the dynamic entitlement of the third virtual machine for the first resource, and the capacity of the first resource of the first physical computer system.

64. The computer program product of claim 55, wherein the normalized entitlement of the first resource on the first physical computer system is determined as a sum of dynamic entitlements of virtual machines executing on the first physical computer system divided by the capacity of the first resource of the first physical computer system.

65. The computer program product of claim 55, wherein the first allocation policy is different than the second allocation policy.

66. The computer program product of claim 55, wherein the first resource comprises at least one of computer memory, processor time, network bandwidth and power consumption.

67. The computer program product of claim 55, wherein the first allocation policy used to determine the dynamic entitlement of the first virtual machine is based on the number of shares held by the first virtual machine, wherein the shares indicate a relative priority of the first virtual machine for entitlement to the first resource.

68. The computer program product of claim 55, wherein the first resource comprises memory, and wherein the estimate of demand for the first resource by the first virtual machine is based on a current working set of the first virtual machine with respect to the memory and a percentage of idle memory.

69. The computer program product of claim 55, wherein the first resource comprises processor time, and wherein the estimate of demand for the first resource by the first virtual machine is based on a running time and a ready time, the running time being time that the first virtual machine runs on a processor of the first physical computer system, the ready time being time that the first process is ready to be run but not scheduled to execute on the processor.

70. The computer program product of claim 55, wherein the first resource comprises a set of software licenses.

71. The computer program product of claim 55, wherein the second physical computer system is different than the another physical computer system.

* * * * *